Dec. 12, 1950     O. W. GROEBER ET AL     2,533,365
EGG YOLK AND WHITE SEPARATOR
Filed June 21, 1947     2 Sheets-Sheet 1
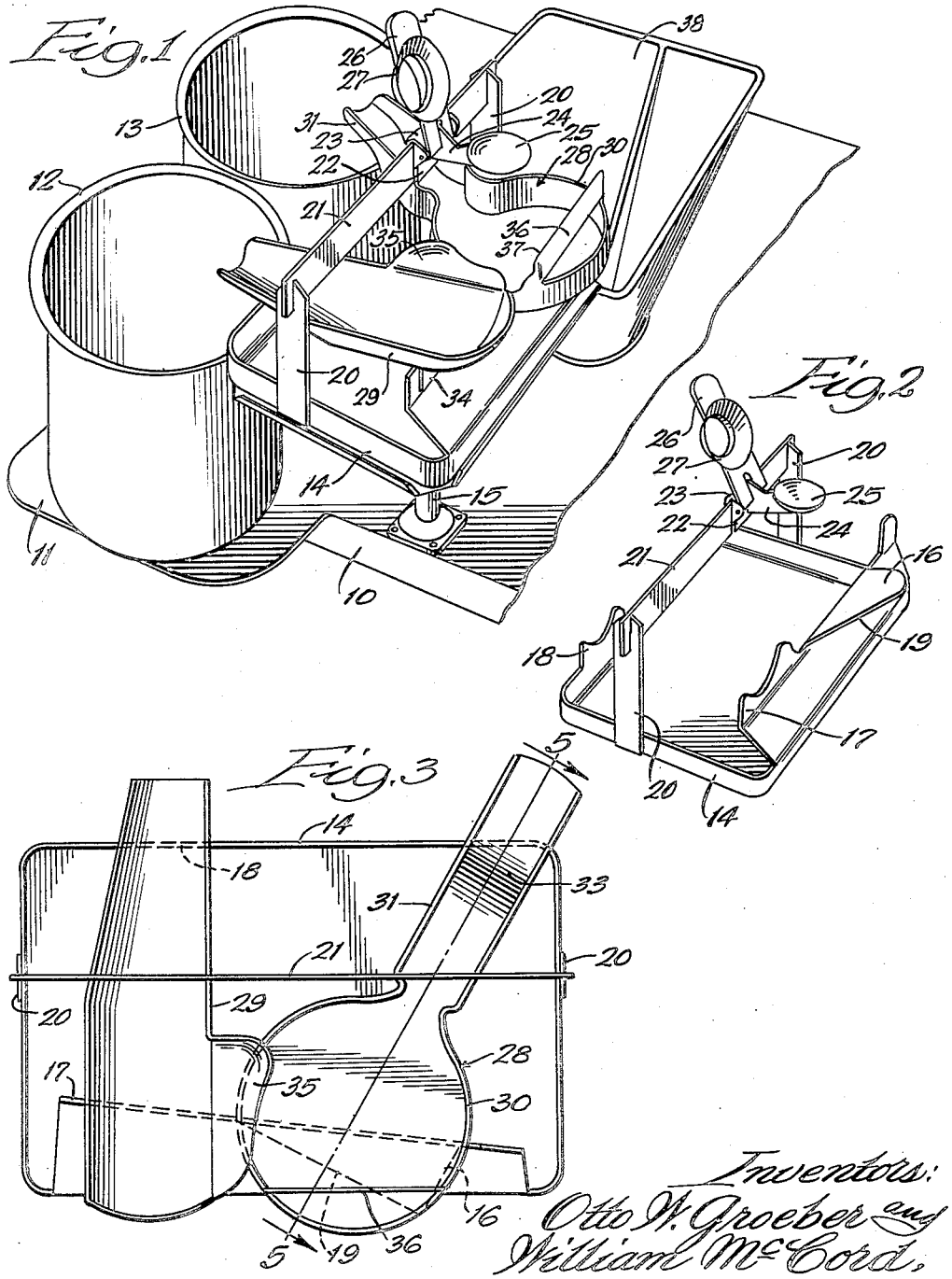
Inventors:
Otto W. Groeber and
William McCord,
By Carl C. Batz
Attorney.

Dec. 12, 1950 O. W. GROEBER ET AL 2,533,365
EGG YOLK AND WHITE SEPARATOR
Filed June 21, 1947 2 Sheets-Sheet 2
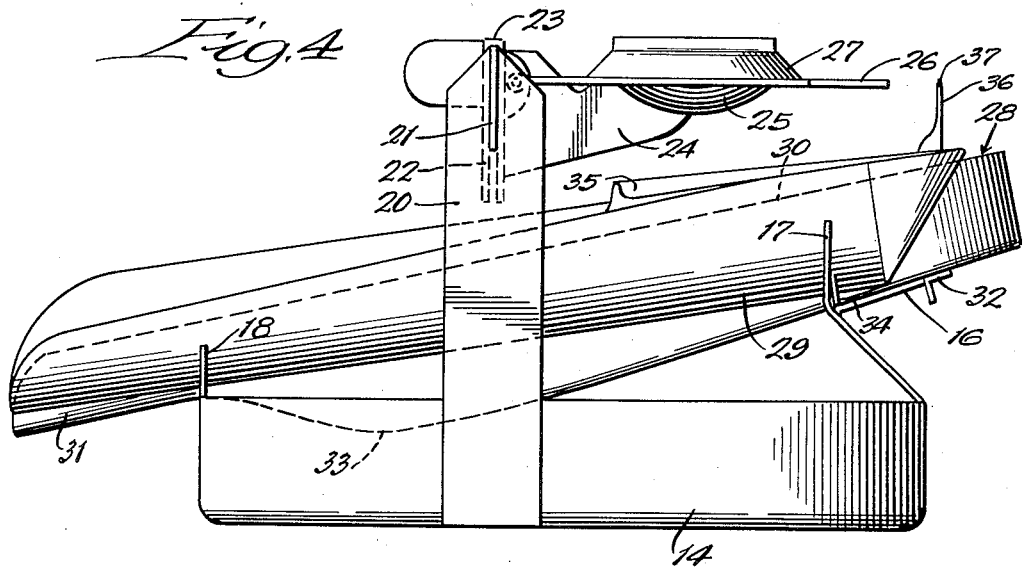
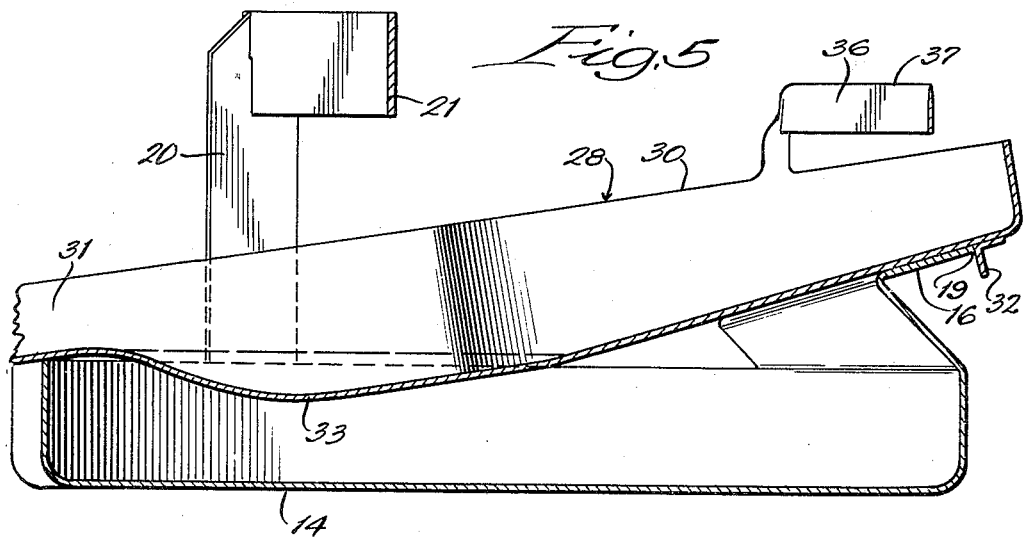
Inventors:
Otto W. Groeber and
William McCord,
By Carl C. Batz
Attorney.

Patented Dec. 12, 1950

2,533,365

UNITED STATES PATENT OFFICE 2,533,365

EGG YOLK AND WHITE SEPARATOR

Otto W. Groeber and William McCord, Louisville, Ky., assignors to Armour and Company, Chicago, Ill., a corporation of Illinois Application June 21, 1947, Serial No. 756,200

2 Claims. (Cl. 146—2)

This invention relates to egg separator apparatus.

In egg separator apparatus heretofore employed, it has been common to employ a tray in which is supported a vessel for receiving the yolks of eggs. The egg is broken over an edge strip and the yolk deposited in a cup. A member pivoted to the cup is brought down over the yolk to shear the white of the egg from about the yolk. The cup is then emptied into a vessel. In the foregoing structure, a substantial movement of the cup is required, and the operation of emptying the yolk takes up time, and there is a tendency for some drippings to be deposited in the tray. Drippings reaching the tray represent a loss because they have to be sold as an inferior product. Further, time is consumed in the shifting of receptacles within the tray for receiving the egg yolk, etc.

An object of the present invention is to provide apparatus, which requires a minimum of movement by the operator through the bringing of the white and the yolk receiving channels close together, while permitting a discharge therefrom through relatively widely diverging outlets. Another object is to provide an extremely simple structure in which the yolk and the white are deposited in separate troughs arranged substantially in adjacent relation to prevent loss of drippings. Yet, another object is to provide an apron structure bridging the point of connection between the white and yolk troughs to prevent loss of material therebetween. A still further object is to provide a simple raised structure enabling large vessels to be supported adjacent thereto while bringing troughs together adjacent the point of separation of the yolks from the whites to require a minimum of movement in the separating of the yolks from the whites. Yet, another object is to provide an improved structure which permits the ready removal of the trough structures when an egg is discovered to be bad so as to quickly prepare the apparatus for receiving the next batch of eggs. Other specific objects and advantages will appear as the specification proceeds.

The invention is illustrated, in a single embodiment, by the accompanying drawings, in which—

Figure 1 is a broken perspective view of apparatus embodying my invention; Fig. 2, a perspective view of a tray and a cup structure supported thereon; Fig. 3, a top plan view; Fig. 4, an enlarged side view in elevation of the tray, troughs and separating apparatus; and Fig. 5, a broken vertical sectional view, the section being taken as indicated at line 5—5 of Fig. 3.

In the illustration given, I provide a base 10, providing a platform 11 upon which may be supported the receptacles 12 and 13. The receptacle 12 is employed for receiving the yolks and the receptacle 13 is employed for receiving the whites of the eggs. A raised tray 14 is supported by means of standards 15 well above the platform 11, as shown more clearly in Fig. 1. The tray 14 may be formed of any suitable material and is adapted to receive any material which may be dropped during the separating operation. Such loss of material with the apparatus herein described is found to be almost negligible. The tray 14, as shown more clearly in Fig. 2, is provided with a rearwardly inclined wall 16 at one end and with an upwardly extending and saddle-shaped wall 17 at the other end. Opposite the wall 17, there is a similar raised wall 18, which is slightly lower and which also provides an arcuate seat. The rearwardly inclined wall 16 is preferably provided with an angularly extending rear edge 19, as shown more clearly in Fig. 2, the purpose of the angular edge being to direct one of the troughs in a direction somewhat obliquely of the tray 14.

Secured to the tray 14 at each end thereof is a standard 20. The upper ends of the standard 20 are slotted to receive a guide beam 21.

Upon the guide beam 21 is mounted a slide member 22, which is in the shape of an inverted U. The sides of the slide member 22 preferably extend below the guide rail 21. Each end of the U-shaped member 22 is preferably notched inwardly at 23 to to facilitate the tilting of the U-shaped member upon the rail 21. Fixed to the slide member 22 is an arm 24 carrying a cup 25. Pivotally mounted upon brackets, carried by the slide member 22, is a shear member 26, having downwardly inclined walls 27.

Extending across the tray underneath the guide bar 21 are the troughs 28 and 29. The trough 28 has a circular inner portion 30 and a channel portion 31 leading therefrom in a relatively oblique direction so as to discharge into the vessel 13. To support the vessel 28 in the desired oblique position, the rear end of the portion 30 is provided with an angle iron stop 32, as shown more clearly in Fig. 5. The stop 32 engages the inclined edge 19 of the tray and is thus held in the desired position. The trough 28 is provided with a depressed portion 33 adapted to hold the whites of one or two eggs so that, if an egg should be spoiled, the whites therefrom will not be allowed to pass into the vessel 13.

The trough 29 is also provided with an angle iron stop 34, which engages the rear surface of wall 17, and the trough is held within the cradles provided by the walls 17 and 18. The trough 29 is also provided with a laterally extending apron 35, which bridges the space between the troughs 28 and 29, as shown more clearly in Fig. 3.

A breaker edge or knife may be provided at any convenient point. In the illustration given, the trough 28 is provided with an integral and upwardly extending member 36, providing a breaker edge 37 at the upper end thereof.

If desired, the casing 10 may provide a large receptacle 38 at one side of the structure for receiving egg shells, etc. Such structure, however, does not form a part of the present invention.

*Operation*

In the operation of the structure, the operator breaks an egg upon the cutting edge 37 and deposits the yolk into the cup 25, the white being allowed to drop into the portion 30 or trough 28 therebelow. The shear device 26 is then lowered so that the white about the yolk is sheared away and drops into the trough below. The operator then smells the shell to determine whether the egg is good or bad. If the egg is good, the cup is turned so as to deposit the yolk into the trough 29. The member 22 may be slid toward the trough 29, is desired, but, for most operations, it is found that a simple twisting of the member 26, which consists of a tilting of the slide member 22 upon its notched indented edge 23 on the rail 21, results in depositing the yolk in cup 25 within the trough 29. In this operation, the apron 35 prevents drippings from reaching the tray below and insures that the yolk itself reaches the trough 29.

If the egg should be bad, the white, which is trapped within the depression 33 of the trough 28, is removed together with the yolk to a separate container.

By employing two troughs, in the manner described, it is possible to bring the inner ends thereof close together so that the operation of separating the yolks from the whites is extremely rapid, while at the same time the whites and yolks, thus separated, are discharged into large containers supported at a distance on the platform 11.

The apparatus produces a more sanitary process in that there is decreased handling of the eggs. Production costs are considerably reduced because the egg whites are separated from the egg yolks without the loss of the white as "drip." The operation is tremendously speeded up because there is no lost motion in lifting the yolk cup to drop the yolk into special containers. An operator who, with the best equipment available, has been able to handle 1.7 cases of eggs per hour, is able, with the new equipment, to handle from 2½ to 3 cases of eggs per hour.

While in the foregoing specification, we have set forth the structure in considerable detail for the purpose of illustrating one embodiment of the invention, it will be understood that such details may be varied widely by those skilled in the art without departing from the spirit of our invention.

We claim:

1. In egg separator apparatus, a frame providing a raised support, a pair of troughs removably carried by said support in downwardly inclined position to discharge at one side of said frame, one of said troughs being adapted to receive egg whites and the other of said troughs being adapted to receive egg yolks, said troughs diverging as they extend downwardly to provide spaced discharge points, a guide rail supported by said frame above said troughs, a yolk-separating cup tiltably carried by said rail over said trough for receiving egg whites, said trough for receiving egg whites being provided with a whites receiving pocket at a point outwardly from the point where the whites drop from the cup thereon, and an apron carried by the yolk trough and extending over the whites trough.

2. The structure of claim 1, in which said raised support consists of a relatively high side wall and a relatively low side wall in spaced apart relation and in which the pocket portion of the inclined whites trough abuts the relatively low wall.

OTTO W. GROEBER.
WM. McCORD.

REFERENCES CITED

The following references are of record in the file of this patent:

UNITED STATES PATENTS

| Number | Name | Date |
|---|---|---|
| 1,030,346 | Swenson et al. | June 25, 1912 |
| 1,494,602 | Jenkins | May 20, 1924 |
| 2,075,270 | Cleveland | Mar. 30, 1937 |

FOREIGN PATENTS

| Number | Country | Date |
|---|---|---|
| 250,142 | Great Britain | Apr. 8, 1926 |